(12) United States Patent
Nakagawa et al.

(10) Patent No.: US 7,015,908 B2
(45) Date of Patent: Mar. 21, 2006

(54) IMAGE GENERATION SYSTEM AND INFORMATION STORAGE MEDIUM

(75) Inventors: Jun Nakagawa, Tokyo (JP); Kazuya Takahashi, Yokohama (JP); Hideki Nakamura, Ota-ku (JP); Masato Kanno, Ota-ku (JP)

(73) Assignee: Namco Ltd., Tokyo (JP)

( * ) Notice: Subject to any disclaimer, the term of this patent is extended or adjusted under 35 U.S.C. 154(b) by 597 days.

(21) Appl. No.: 09/890,347

(22) PCT Filed: Nov. 29, 2000

(86) PCT No.: PCT/JP00/08383

§ 371 (c)(1),
(2), (4) Date: Sep. 20, 2001

(65) Prior Publication Data

US 2002/0135603 A1    Sep. 26, 2002

(30) Foreign Application Priority Data

Dec. 3, 1999    (JP) ................................. 11-345313

(51) Int. Cl.
  *G06K 9/36* (2006.01)
(52) U.S. Cl. ...................... 345/426; 345/418; 345/581; 345/582; 345/589; 345/597; 382/164; 382/181; 382/254; 382/276
(58) Field of Classification Search ................ 382/276, 382/254, 181, 164, 312; 345/597, 589, 582, 345/581, 426, 418, 433, 432, 431, 430, 429, 345/425
See application file for complete search history.

(56) References Cited

U.S. PATENT DOCUMENTS

| | | | | |
|---|---|---|---|---|
| 5,253,339 A | * | 10/1993 | Wells et al. ................ | 345/426 |
| 5,515,159 A | * | 5/1996 | Sites et al. ................ | 356/237.1 |
| 5,608,451 A | * | 3/1997 | Konno et al. ................ | 348/69 |
| 5,682,505 A | * | 10/1997 | Usami et al. ................ | 345/418 |
| 5,786,822 A | * | 7/1998 | Sakaibara et al. ........... | 345/582 |
| 5,786,908 A | * | 7/1998 | Liang ......................... | 358/518 |
| 5,821,999 A | * | 10/1998 | Barnsley et al. ............. | 348/272 |
| 5,898,169 A | * | 4/1999 | Nordbryhn .............. | 250/223 B |
| 6,674,917 B1 | * | 1/2004 | Hisaki et al. ................ | 382/284 |

FOREIGN PATENT DOCUMENTS

| | | |
|---|---|---|
| JP | A 5-282466 | 10/1993 |
| JP | A 6-266853 | 9/1994 |
| JP | A 6-348859 | 12/1994 |

(Continued)

*Primary Examiner*—Ricardo Osorio
*Assistant Examiner*—Vincent E. Kovalick
(74) *Attorney, Agent, or Firm*—Oliff & Berridge, PLC

(57) ABSTRACT

There are provided an image generation system and information storage medium which can generate an image of a simple object with reduced processing load, the brightness of the simple object being variable according to the amount of light sent from a light source and received by the simple object. The image generation system comprises a light-source simple processing section (114) for performing a light-source simple processing relative to the simple object. The light-source simple processing section (114) performs computation for information relating to at least one of the brightness and color on primitive surfaces constructing the simple object, based on an angle difference between a line-of-sight vector of a virtual camera and a light vector from the light source. The primitive surfaces are set to have first and second color information, and information relating to the color of the primitive surfaces is computed by interpolation computation based the first and second color information and the information of at least one of the brightness and color of one of the primitive surfaces.

30 Claims, 13 Drawing Sheets

FOREIGN PATENT DOCUMENTS

| | | |
|---|---|---|
| JP | A 7-21407 | 1/1995 |
| JP | A 8-16816 | 1/1996 |
| JP | A 9-167258 | 6/1997 |
| JP | A 10-83461 | 3/1998 |

* cited by examiner

620 TEXTURE COLOR OF A PIXEL Puv
Ct(Rt,Gt,Bt)

610 TEXTURE BUFFER

630 FRAME BUFFER

640 DISPLAYED COLOR OF PIXEL ON WHICH THE TEXTURE COLOR OF A PIXEL Puv IS MAPPED
Cd(Rd,Gd,Bd)

SCREEN

PLATE-LIKE POLYGON

COMPUTATION OF COLORING VALUE
Cd(Rd,Gd,Bd) = Ct(Rt,Gt,Bt) × Cp(Rp,Gp,Bp)

IMAGE GENERATION SYSTEM AND INFORMATION STORAGE MEDIUM

TECHNICAL FIELD

The present invention relates to an image generation system and information storage medium.

BACKGROUND ART

In the prior art, there is known an image generation system which can generate an image viewable from a given viewpoint in an object space that is a virtual three-dimensional space Such an image generation system is very popular as a system which can implement a so-called virtual reality. If the image generation system is for a racing game, a player can enjoy a three-dimensional game by controlling and running a racing car (or object) in the object space to compete with the other racing cars controlled by the other players or computer.

In such an image generation system, it is an important technical subject that a more realistic image is generated to improve the virtual reality for the players.

For example, the brightness of an object surface is calculated based on the reflection of light from a light source on the object surface, and a light source processing is made to set the color according to the brightness. Thus, the object may be shaded to provide a more realistic three-dimensional image. However, this increases the processing load in the image generation.

On the other hand, the image generation system of the prior art was subjected to various improvements for reducing the processing time in generation of the image, since view images must be generated in real time within the virtual three-dimensional space in accordance with various changing positions of a moving object.

For example, an image representing a tree located in the background of a scene may be generated by mapping the texture of the tree onto a simple object consisting of one plate-like polygon, rather than formation of a three-dimensional object constructed by a number of polygons. In such a manner, the number of polygons to be processed can be reduced, resulting in great reduction of the processing time.

However, such a simple object was generated without being subjected to any light source processing leading to increase of the processing time since it was used to reduce the processing time. Therefore, the tree or the like constructed by the simple object would always be displayed with the same tone and brightness irrespectively of the positional relationship between the tree and the light source. Inherently, the brightness on the object surface depends on the reflection of light which was variable according to the angle between the direction of the light and each of the polygon surfaces constructing the object. Since the simple object is always displayed with the same brightness irrespectively of the incident angle of the light, an unnatural image will be generated with less reality.

DISCLOSURE OF THE INVENTION

It is therefore an objective of the present invention to provide an image generation system and information storage medium which can generate an image of a simple object in which the brightness is variable according to the amount of light sent from a light source and received by the simple object, with reduced processing load.

(1) According to the present invention, there is provided an image generation system for generating an image, comprising:

means which performs a light-source simple processing, the processing being necessary to change at least one of the brightness and color of a surface of a simple object according to the amount of light that is sent from a light source and received by the surface of the simple object; and means which generates an image of the simple object based on a result of the light-source simple processing.

The present invention also provides a computer-usable program embodied on an information storage medium or in a carrier wave, comprising information (or program) for implementing (or executing) the above described means.

The simple object is one that is simply formed to reduce the processing load in the image generation. The simple object has one or more primitive surfaces. The simple object can be formed by one or more polygons disposed parallel to one another In general, the light source processing is necessary to compute the brightness of a surface of the simple object relative to the light from the light source and to provide a color according to the brightness on the surface.

According to the present invention, the light-source simple processing is made to change at least one of the brightness and color of the surface of the simple object. Thus, the brightness of the primitive surfaces constructing the simple object can be changed according to the amount of received light. Therefore, a more realistic image can be generated without artificiality even if the positional relationship between the simple object and the light source is changed.

(2) the present invention further provides an image generation system for generating an image, comprising:

means which performs computation to obtain information relating to at least one of the brightness and color of a primitive surface constructing a simple object, based on an incident angle of a light vector from a light source; and means which generates an image of the simple object based on the information relating to at least one of the brightness and color of the primitive surface constructing the simple object.

The present invention further provides a computer-usable program embodied on an information storage medium or in a carrier wave, comprising information (or program) for implementing (or executing) the above described means The simple object is one that is simply formed to reduce the processing load in the image generation. The simple object has one or more primitive surfaces. The simple object can be formed by one or more polygons disposed parallel to one another.

According to the present invention, the brightness of the primitive surface constructing the simple object can be changed based on an incident angle of the light vector from the light source. Even though the positional relationship between the simple object and the light source is changed, a more realistic image can be generated without artificiality.

(3) In each of the image generation system and the program embodied on an information storage medium or in a carrier wave according to the present invention, computation for obtaining information relating to at least one of the brightness and color of the primitive surface constructing the simple object may be performed based on an angle difference between a line-of-sight vector of a virtual camera and a light vector from the light source.

The line-of-sight vector of the virtual camera means a vector parallel to the line-of-sight of the virtual camera or a gazing direction from a viewpoint of the virtual camera toward a viewing object In the light source processing for setting the brightness according to the amount of received light, the angle difference between the emitting direction of the light from the light source and the normal direction of the primitive surface is usually important.

However, the processing load will be increased by calculating the normal direction of each primitive surface.

With the simple object, there is often to change the orientation of the simple object to avoid any appearance defect due to the simplification. So that the processing load will increase if the normal direction of each primitive surface is computed after transforming into the viewpoint coordinate system as in the conventional light source processing According to the present invention, however, the line-of-sight vector of the virtual camera is used to compute the information relating to at least one of the brightness and color of the primitive surface constructing the simple object, in place of the orientation of each primitive surface. Therefore, it is not required to calculate the normal vector for each primitive surface and transformation into the viewpoint coordinate system is not necessary. As a result, the processing load can greatly be reduced.

(4) In each of the image generation system and the program embodied on an information storage medium or in a carrier wave, according to the present invention, the angle difference may be computed based on two-axis components in both the line-of-sight vector of the virtual camera and the light vector from the light source.

The computation of the angle difference based on two-axis components in both the line-of-sight vector of the virtual camera and the light vector of the light source is made based on X- and Z-components, for example. In other words, the line-of-sight and light vectors are projected onto a two-axis plane (e.g , X-Z plane) to determine an angle difference in the two-axis plane.

If it is required to consider the space only in the horizontal direction for the light source processing, the computation of the angle difference based only on the two-axis components can reduce the processing load.

(5) Each of the image generation system and the program embodied on an information storage medium or in a carrier wave, according to the present invention may further comprise:

means which rotates the simple object such that a normal vector of the primitive surfaces constructing the simple object becomes parallel to the line-of-sight vector of the virtual camera.

If the orientation of the primitive surface constructing the simple object is set to be parallel to the line-of-sight direction of the virtual camera, the angle difference coincides with the angle difference of the conventional light source processing. Therefore, the same advantage relating to the setting of the brightness of the simple object surface as in the conventional light source processing can be obtained by a simplified processing.

(6) In each of the image generation system and the program embodied on an information storage medium or in a carrier wave, according to the present invention, the light source may be a source of parallel rays.

If the light vector from the light source spreads in the radial direction, it is required to compute the orientation of the light according to the position of each primitive surface.

If the light rays are parallel as in the present invention, however, the orientation of the light is the same for all the primitive surfaces constructing the simple object. Therefore, it is not required to compute the orientation of the light according to the position of each primitive surface. This reduces the processing load.

(7) In each of the image generation system and the program embodied on an information storage medium or in a carrier wave, according to the present invention, information relating to at least one of the brightness and color of a primitive surface constructing one simple object among a plurality of simple objects may be used to generate an image of a primitive surface of another simple object among the plurality of simple objects.

For example, the image may be generated by using the same information relating to the brightness or color for all the simple objects. Alternatively, the simple objects may be divided into a plurality of groups, and for each group, the same information relating to the brightness or color may be used.

According to the present invention, the information relating to the brightness or color of one of the simple objects can be used to generate images of the other simple objects. Thus, the amount of computation can be reduced.

(8) In each of the image generation system and the program embodied on an information storage medium or in a carrier wave, according to the present invention, the simple object or primitive surfaces constructing the simple object may be set to have first and second color information; and information relating to the color of the primitive surfaces may be computed by interpolation computation based on the first and second color information and information relating to at least one of the brightness and color of one of the primitive surfaces.

The information relating to the colors of the primitive surfaces may be R, G and B values in the primitive surfaces. The interpolation computation may include the blending processing of the first and second color information using the blending coefficient obtained from the information relating to the brightness, for example.

The first and second color information may be set for each of the simple objects or for each primitive surface constructing the simple object.

When the light source processing is performed, single color information is usually set for each object or each primitive surface, and the coloring degree of that color is regulated according to the brightness of the light from the light source.

On the contrary, the present invention sets the first and second color information relative to the simple object or the primitive surfaces constructing the simple object, and computes the color information of the primitive surfaces constructing the simple object based on the first and second color information and the information relating to at least one of the brightness and color of one of the primitive surfaces constructing the simple object.

According to the present invention, any color having optimum brightness can be placed on the surface of the simple object within a range defined by the first and second color information.

Alternatively, the first color information may indicate the darkest state or a state in which no light is received while the second color information indicating the brightest state or a state in which the maximum amount of light is received by the simple object or the primitive surfaces constructing the simple object. Thus, variable color can be represented within the range between the darkest and brightest colors, according to the amount of light sent from the light source and received by the simple object.

(9) The present invention further provides an image generation system for generating an image, wherein a simple object or a primitive surface constructing the simple object are set to have first and second color information; and the image generation system comprising:

means which computes color information of the primitive surface by interpolation computation performed by using the first and second color information according to the amount of light that is sent from a light source and received by the primitive surface: and means which generates an image of the simple object based on the color information of the primitive surfaces, The present invention further provides a computer-usable program embodied on an information storage medium or in a carrier wave, comprising information (or program) for implementing (or executing) the above described means, The information relating to the colors of the primitive surface may be R, G and B values in the primitive surfaces The interpolation computation may include blending processing of the first and second color information using a given blending coefficient according to the amount of light sent from the light source and received by the primitive surfaces constructing the simple object, for example.

The first and second color information may be set for each of the simple objects or for each primitive surface constructing the simple object.

When the light source processing is performed, single color information is usually set for each object or each primitive surface, and the coloring degree of that color is regulated according to the brightness of the light from the light source.

On the contrary, the present invention sets the first and second color information relative to the simple object or the primitive surfaces constructing the simple object and computes the color information of the primitive surfaces based on the first and second color information and the amount of light received by the primitive surfaces.

According to the present invention, any color having optimum brightness can be placed on the surface of the simple object within a range defined by the first and second color information.

Alternatively, the first color information may indicate the darkest state or a state in which no light is received while the second color information indicating the brightest state or a state in which the maximum amount of light is received by the simple object or the primitive surfaces constructing the simple object. Thus, variable color can be represented within the range between the darkest and brightest colors, according to the amount of light sent from the light source and received by the simple object.

BEST MODE FOR CARRYING OUT THE INVENTION

An embodiment of the present invention is described below, with reference to the accompanying drawings. Note that the description below concerns an example where this embodiment is applied to a racing game, but it should be obvious that this invention is not limited thereto and it can equally well be applied to various other types of game.

1. Configuration

Figure 1:
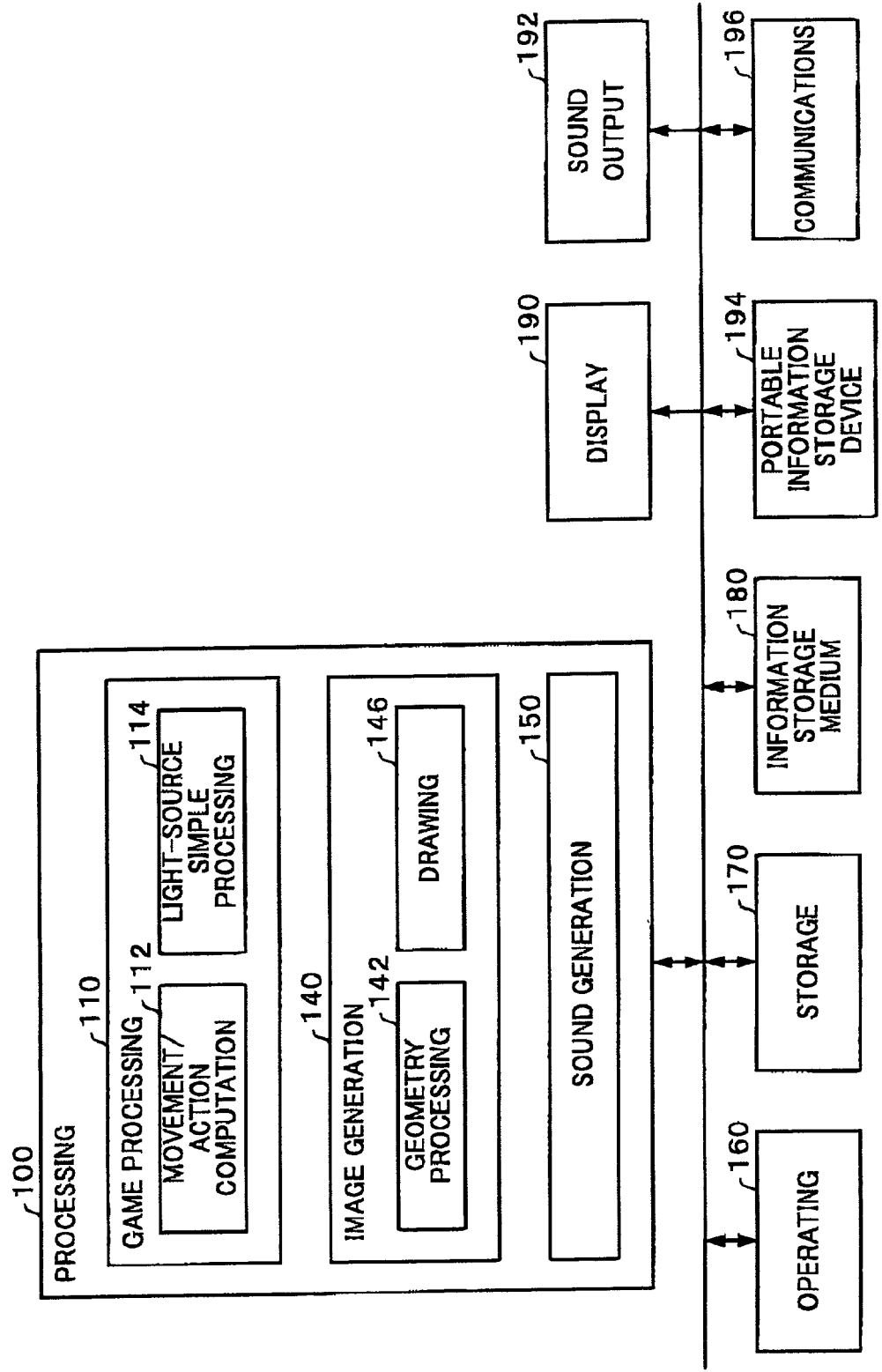
FIG. 1 is a block diagram of an image generation system according to the embodiment of the present invention.

FIG. 1 shows a block diagram of this embodiment. In this figure, this embodiment may comprise at least a processing section 100 (or a processing section 100 with a storage section 170 or a processing section 100 with a storage section 170 and an information storage medium 180) Each of the other blocks (e.g., operating section 160, display section 190, sound output section 192, portable information storage device 194 and communications section 196) may take any suitable form.

The processing section 100 performs various processings for control of the entire system, commands to the respective blocks in the system, game processing, image processing, sound processing and so on. The function thereof can be implemented through any suitable hardware means such as various processors (CPU, DSP and so on) or ASIC (gate array or the like) or a given program (or game program).

The operating section 160 is used to input operational data from the player and the function thereof can be implemented through any suitable hardware means such as a lever, a button, a housing or the like.

The storage section 170 provides a working area for the processing section 100, communications section 174 and others. The function thereof can be implemented by any suitable hardware means such as RAM or the like.

The information storage medium (which may be a computer-usable storage medium) 180 stores information including programs, data and others. The function thereof can be implemented through any suitable hardware means such as optical memory disk (CD or DVD), magneto-optical disk (MO), magnetic disk, hard disk, magnetic tape, memory (ROM) or the like. The processing section 100 performs various processings in the present invention (or this embodiment) based on the information that has been stored in this information storage medium 180. In other words, the information storage medium 180 stores various pieces of information (or programs and data) for implementing (or executing) the means of the present invention (or this embodiment) which are particularly represented by the blocks included in the processing section 100.

Part or the whole of the information stored in the information storage medium 180 will be transferred to the storage section 170 when the system is initially powered on. The information stored in the information storage medium 180 includes at least one of a program code for performing the processing according to the present invention, image data, sound data, shape data of displayed objects, table data, list data, information for instructing the processing according to the present invention, information for implementing the processing according to the instructions, and so on.

The display section 190 is to output an image generated according to this embodiment and the function thereof can be implemented by any suitable hardware means such as CRT, LCD or HMD (Head-Mount Display).

The sound output section 192 is to output a sound generated according to this embodiment and the function thereof can be implemented by any suitable hardware means such as speaker.

The portable information storage device 194 is to store the player's personal data and save data and may be take any suitable form such as memory card, portable game machine and so on.

The communications section 196 performs various controls for communication between the game system and any external device (e.g., host machine or other image generation system) The function thereof can be implemented through any suitable hardware means such as various types of processors or communication ASIS or according to any suitable program.

The program or data for executing the means in the present invention (or this embodiment) may be delivered from an information storage medium included in a host machine (or server) to the information storage medium 180 through a network and the communications section 196. The use of such an information storage medium in the hose device (or server) falls within the scope of the invention.

The processing section 100 further comprises a game processing section 110, an image generation section 140 and a sound generation section 150.

The game processing section 110 performs various processes such as coin (or charge) reception, setting of various modes, game proceeding, setting of scene selection, determination of the position and rotation angle (about X-, Y- or Z-axis) of an object, movement of the object (motion processing), determination of the view point and visual line (direction), arrangement of the object within the object space, hit checking, computation of the game results (or scores), processing for causing a plurality of players to play in a common game space, various game computations including game-over and other processes, based on operational data from the operating section 160 and according to the personal data, saved data and game program from the portable information storage device 194.

The image generation section 140 is to perform various image processings according to the commands or the like from the game processing section 110. The sound generation section 150 is to perform various sound processings according to the commands and the like from the game processing section 110.

All the functions of the image and sound processing sections 140, 150 can be implemented by any suitable hardware means or according to the program Alternatively, these functions can be implemented by both the hardware means and program.

The game processing section 110 further comprises a movement/action computation section 112 and a light-source simple processing section 114.

The movement/action computation section 112 is to calculate the information of movement for objects such as motorcars and so on (positional and rotation angle data) and the information of action for the objects (positional and rotation angle data relating to the parts in the objects) For example, the movement/action computation section 112 may cause the objects to move and act based on the operational data inputted by the player through the operating section 160 and according to the game program.

More particularly, the movement/action computation section 114 may determine the position and rotational angle of the object, for example, for each one frame (1/60 seconds). For example, it is now assumed that the position of the object for (k-1) frame is PMk-1, the velocity is VMk-1, the acceleration is Amk-1, time for one frame is Δt. Thus, the position PMk and velocity VMk of the object for k frame can be determined by the following formulas (1) and (2):

$$PMk = PMk-1 + VMk-1 \times \Delta t \quad (1)$$

$$VMk = VMk-1 + Amk-1 \times \Delta t \quad (2)$$

The light-source simple processing section 114 performs the light-source simple processing required to change at least one of the brightness and color of a surface of a simple object, according to the amount of light received by the simple object. Alternatively, the light-source simple processing section 114 may calculate the information relating to at least one of the brightness and color on the primitive surfaces constructing the simple object, based on the incident angle of the light vector from the light source.

Moreover, the light-source simple processing section 114 may calculate the information relating to at least one of the brightness and color on the primitive surfaces constructing the simple object, based on the angle difference between the line-of-sight vector of the virtual camera and the light vector of the light source. In addition, the light-source simple processing section 114 maybe constructed to calculate the angle difference based on two-axis components in the line-of-sight and light vectors of the virtual camera and light source.

Furthermore, the light-source simple processing section 114 may set first and second color information relative to the simple object or the primitive surfaces constructing the simple object and perform interpolation computation based on the information relating to at least one of the brightness and color determined for one of the primitive surfaces, the interpolation computation being then used to calculate the information relating to the color of the primitive surfaces.

The image generation section 140 comprises a geometry processing (or three-dimensional coordinate calculating) section 142 and a drawing (or rendering) portion 146.

The geometry processing section 142 performs various geometry processings (three-dimensional coordinate calculation) such as coordinate transformation, clipping, perspective transformation or light source calculation.

The drawing section 146 draws an object based on the data of the object after geometry processed (or perspectively transformed) and a texture stored in a texture buffer. The drawing section 146 also generates a simple object based on the results of the light-source simple processing section 114.

The image generation system of the present invention may be dedicated for a single-player mode in which only a single player can play the game or may have a multi-player mode in which a plurality of players can play the game.

If a plurality of players play the game, only a single terminal may be used to generate game images and sounds to be provided to all the players. Alternatively, a plurality of terminals interconnected through a network (transmission lien or communication line) may be used in the present invention.

2. Features of this Embodiment

The relationship between the brightness of an object and the light from the light source is first described in connection with FIG. 2.

Figure 2:
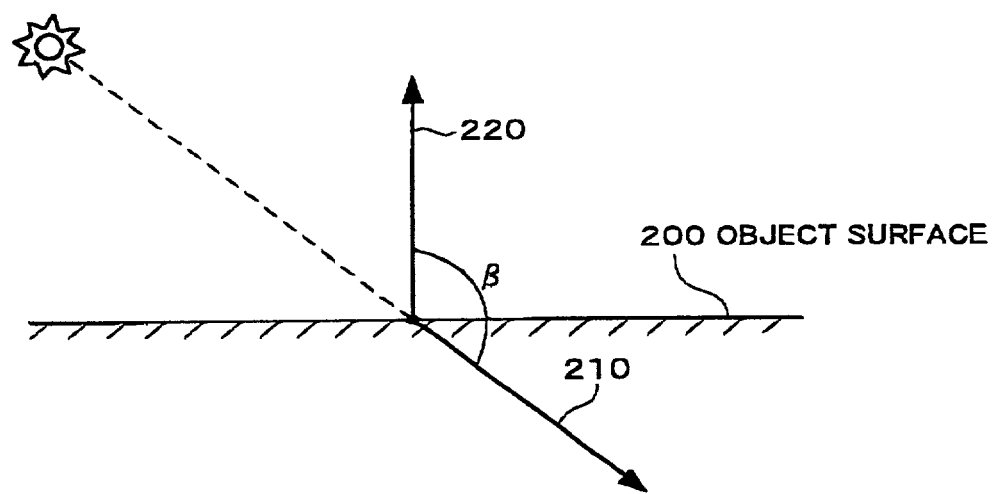
FIG. 2 illustrates the relationship between the brightness of an object surface and the light from the light source

Referring now to FIG. 2, reference numeral 200 designates the surface of the object; 210 a light vector from a light source; and 220 the normal vector on the object When the light source is in the normal direction on the object surface and when it is considered that the energy of light incident on the object surface per unit area becomes maximum, the energy of light diffusely reflected from the incident point also becomes maximum. It may thus be considered that the brightness on the object surface depends on an angle β included between the normal vector on the object and the light vector entering the object surface. In other words, the brightness on the object surface will increase as the value of the angle β approaches 180 degrees.

Based on such a relationship, the light source processing is performed to calculate the brightness on the surface of the object and to place a color corresponding to the calculated brightness on the object surface.

Thus, the normal vector on each of the polygon faces must be calculated while the optimum color for each polygon must be calculated based on the angle β between the normal vector on each of the polygons and the light. Thus, the ordinary technique will have an increased load of calculation for light source processing.

However, this embodiment can provide the same advantage as in the light source processing with reduction of the calculation load, by performing the light-source simple processing as will be described below.

Figure 3:
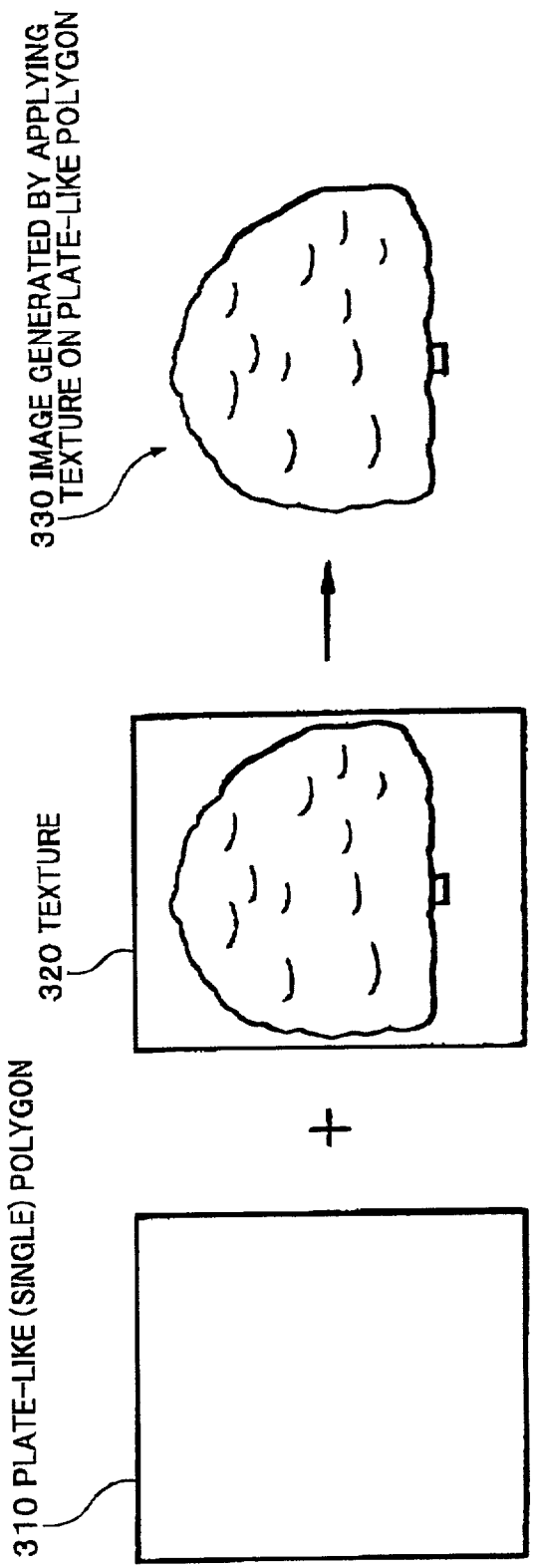
FIG. 3 illustrates a step of using a simple object to form a tree according to the embodiment.

First of all, the structure of a simple object usable in this embodiment will be described. FIG. 3 illustrates the structure of a tree which is one simple object usable in this embodiment. To reduce the processing load in the image generation by reducing the number of polygons, this embodiment will not form a three-dimensional object or tree, but will generate the image of the tree by mapping a plate-like (or single or board) polygon 310 onto a texture 320 for the tree (see 330).

Figure 4:
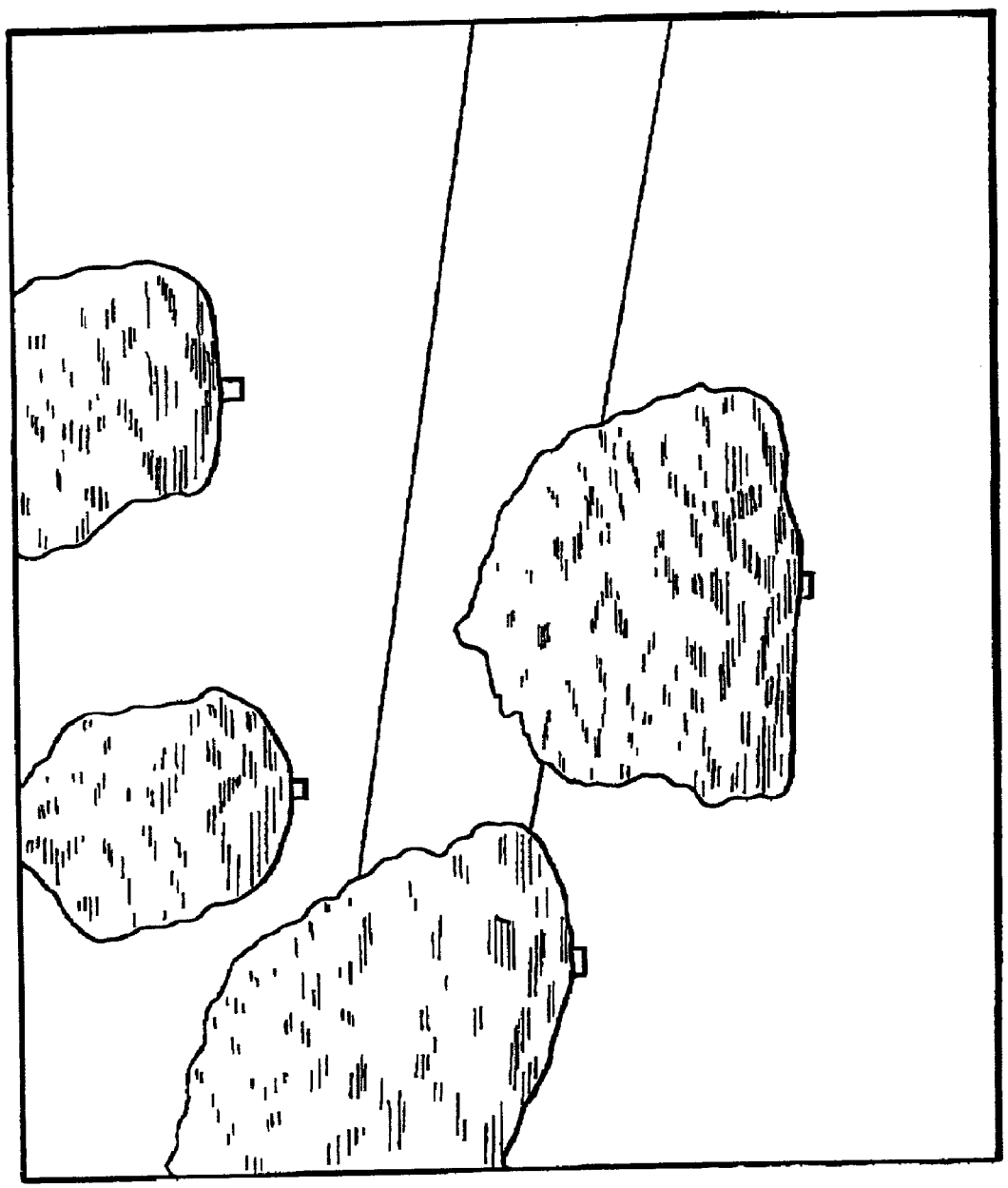
FIG. 4 shows a game scene in which the simple objects of the embodiment are displayed.
Figure 5:
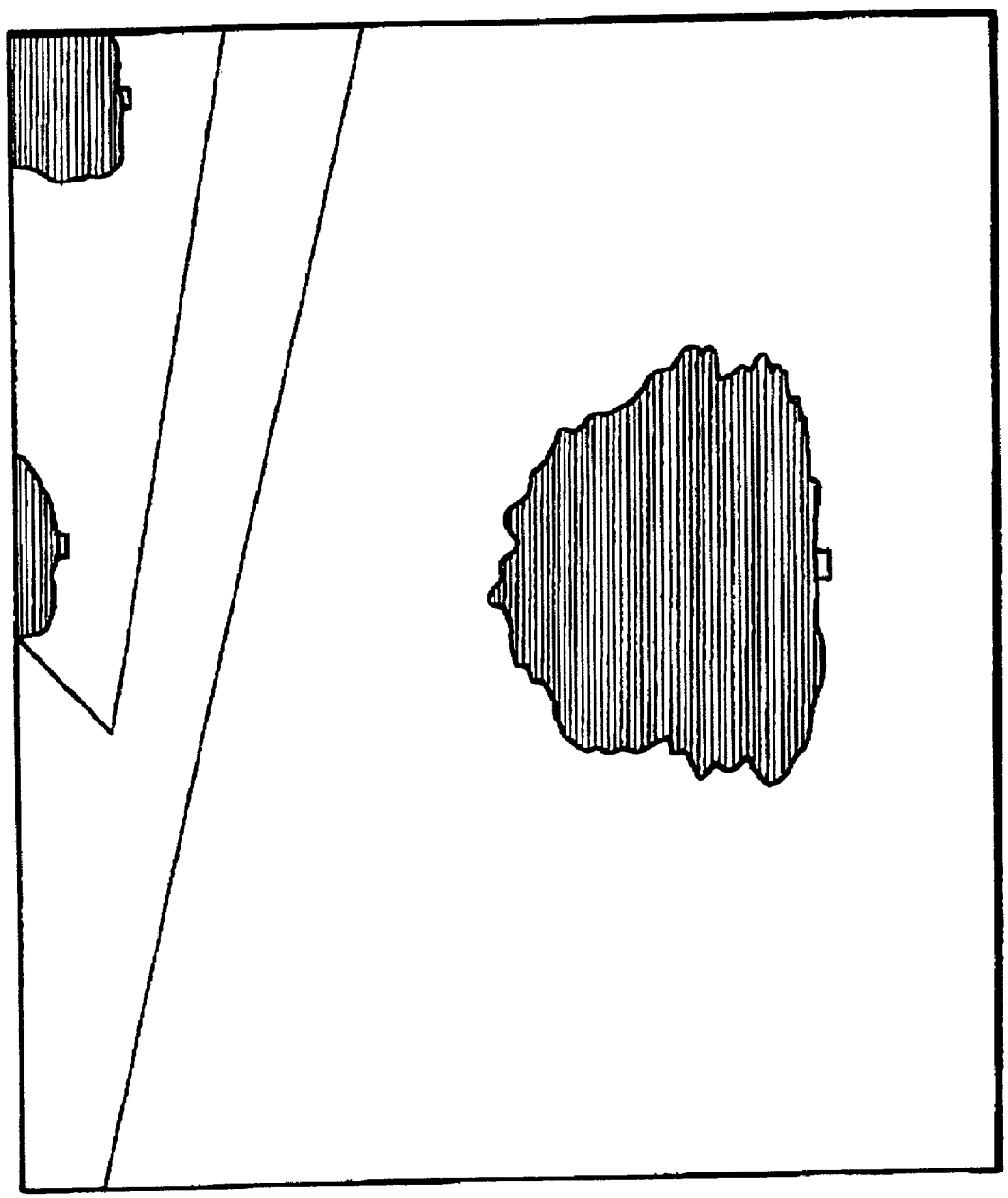
FIG. 5 shows another game scene in which the simple objects of the embodiment are displayed.
Figure 6A:
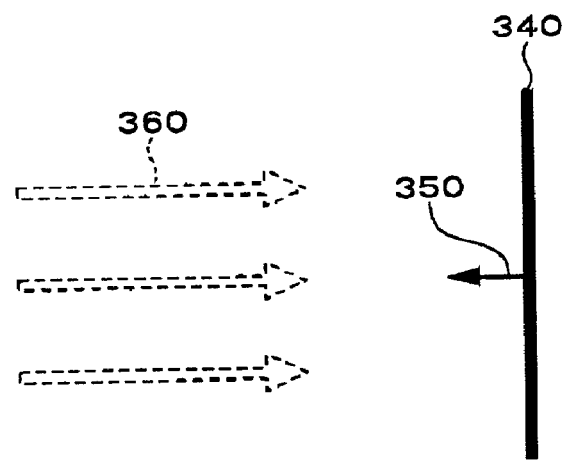
FIGS. 6A and 6B illustrate the relationship between such a plate-like polygon (or single polygon, or board polygon) as shown in FIGS. 4 and 5 and the light from the light source.

FIGS. 4 and 5 exemplify game scenes in which the simple objects are displayed according to this embodiment. FIGS. 6A and B respectively illustrate the relationship between the plate-like (or single or board) polygon in each of FIGS. 4 and 5 and the light from the light source.

Figure 6B:
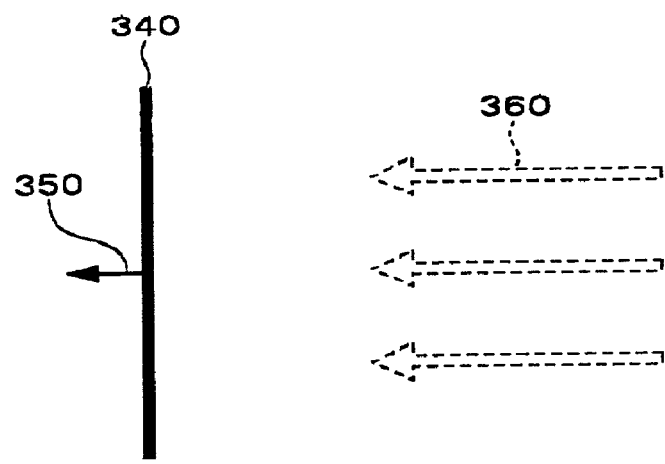

In FIGS. 6A and 6B, reference numeral 340 denotes a plate-like (or single or board) polygon as viewed from one side (which actually has no thickness); 350 denotes a normal vector on the plate-like (or single or board) polygon: and 360 denotes the light from the light source. The side of the plate-like polygon from which the normal vector extends is a front face on which the texture of the tree is mapped.

FIG. 6A illustrates the light 360 is vertically sent to the front surface of the plate-like (or single or board) polygon 340. This means that the maximum amount of light is received by the tree. In such a case, the tree is represented by generating an image having the brightest color, as shown in FIG. 4.

FIG. 6B illustrates the light 360 is vertically sent to the back surface of the plate-like (or single or board) polygon 340. This means that the amount of light received by the tree is minimum. In this case, the darkest image of the tree is generated as shown in FIG. 5.

If the amount of light received by the tree is between the maximum and minimum values, interpolation computation will be carried out to generate an image of the tree having its middle brightness using the brightest and darkest colors.

In such a manner, this embodiment provides the same effect as in the ordinary light source processing by changing the brightness of the simple object according to the amount of received light, but its technique is different from that of the ordinary light source processing.

More particularly, this embodiment will not calculate the normal vector on each of the polygon faces constructing the object as in the ordinary light source processing, but will calculate the information relating to at least one of the brightness and color on the primitive surfaces constructing the simple object primitive surfaces constructing the simple object, based on the angle difference between the line-of-sight vector of the virtual camera and the light vector of the light source.

Figure 7:
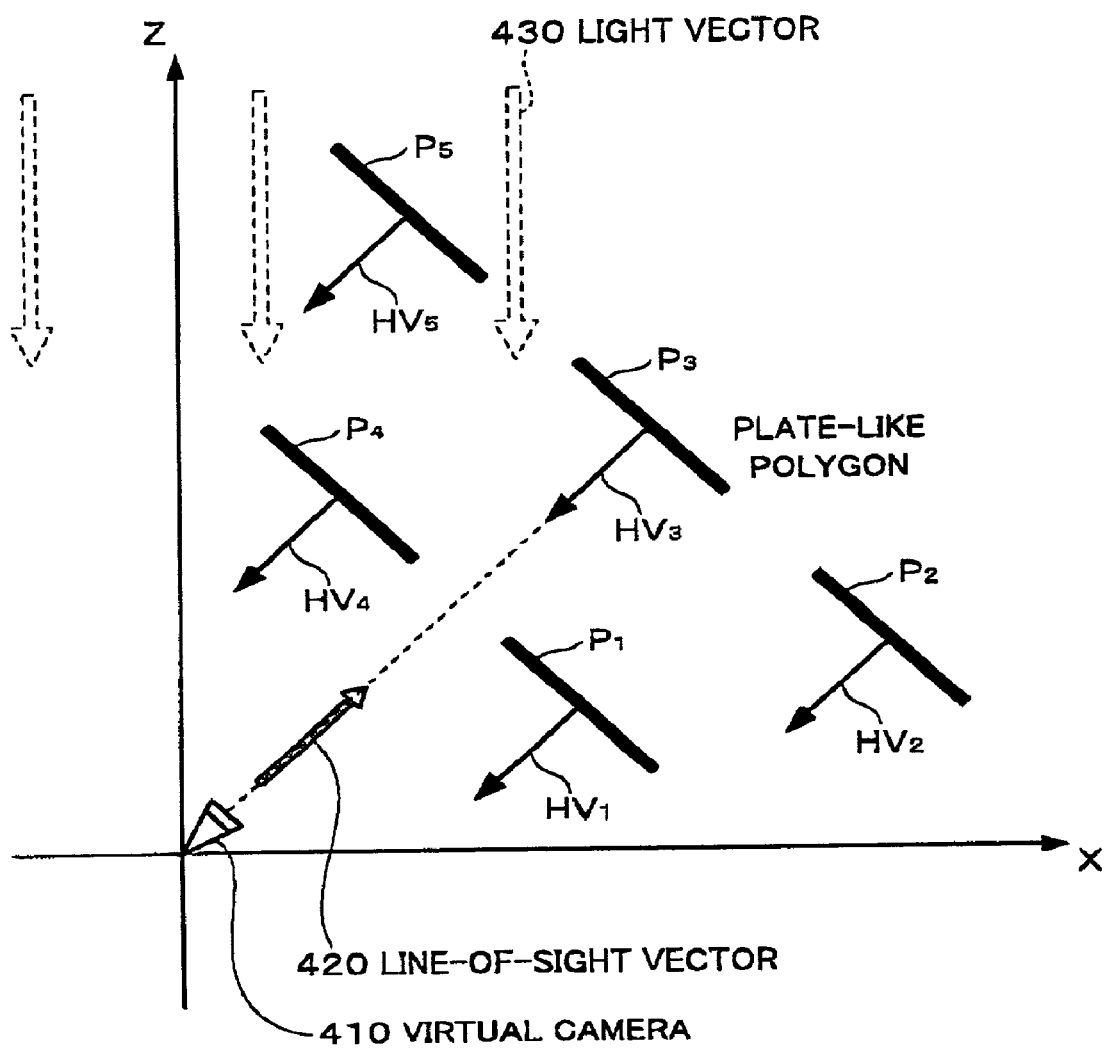
FIG. 7 illustrates the relationship between the plate-like polygon (or single polygon, or board polygon) being the simple object of the embodiment and the line-of-sight vector of a virtual camera.

FIG. 7 illustrates the relationship between the plate-like (or single or board) polygon being a simple object according to this embodiment and the line of-sight vector of the virtual camera.

In FIG. 7, the line-of-sight vector 420 of the virtual camera (or the line -of-sight direction in the virtual camera) and a plurality of plate-like (or single or board) polygons P1–P5 all of which are simple objects are projected Onto a plane XZ. HV1–HV5 are normal vectors for the respective plate-like (or single or board) polygons P1–P5 and all parallel to the line-of-sight direction. This is because the orientations of the plate-like (or single or board) polygons P1–P5 are so set that they are always parallel to the line-of-sight direction.

If the simple objects such as plate-like polygons are used and when the line-of-sight direction is changed, the back faces of the plate-like (or single or board) polygons P1–P5 will be exposed. To avoid such a problem, it is required to regulate the orientations of the simple objects. Since the orientations of the plate-like polygons are parallel to the line-of-sight direction in this embodiment, all the orientations of the plate-like polygons can be determined if the line-of-sight direction is determined. Thus, the calculation for the orientations of the plate-like polygons can be greatly reduced.

Since the normal vectors on the plate-like polygons are parallel to the line-of-sight vector (in the opposite orientation), the light-source simple processing can be carried out using the line-of-sight vector in place of the normal vectors.

Figure 8:
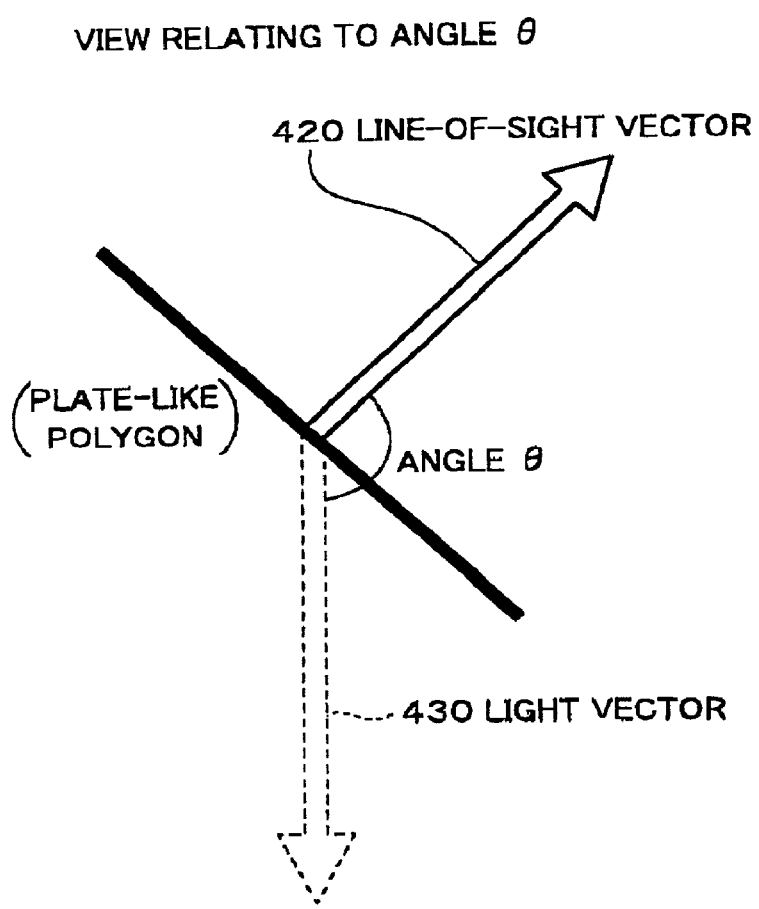
FIG. 8 is an angle difference θ between the line-of-sight vector of the virtual camera and the light vector of the light source.

FIG. 8 illustrates an angle difference θ between a line-of-sight vector 420 in the virtual camera and a light vector 430 from the light source.

As described in connection with FIG. 2, it may be considered that the brightness on the object surface depends on the angle β created between the normal vector on that object and the light vector entering the object surface In this embodiment, however, the normal vector on a plate-like polygon is parallel to the line-of-sight vector (in the opposite orientation). Therefore, this embodiment determines a coefficient α representing the brightness on each of the polygon faces constructing the simple object, based on the angle difference θ between the line-of-sight vector 420 of the virtual camera and the light vector 430 from the light source. For example, such a coefficient may be determined from α=θ/π.

Figure 9:
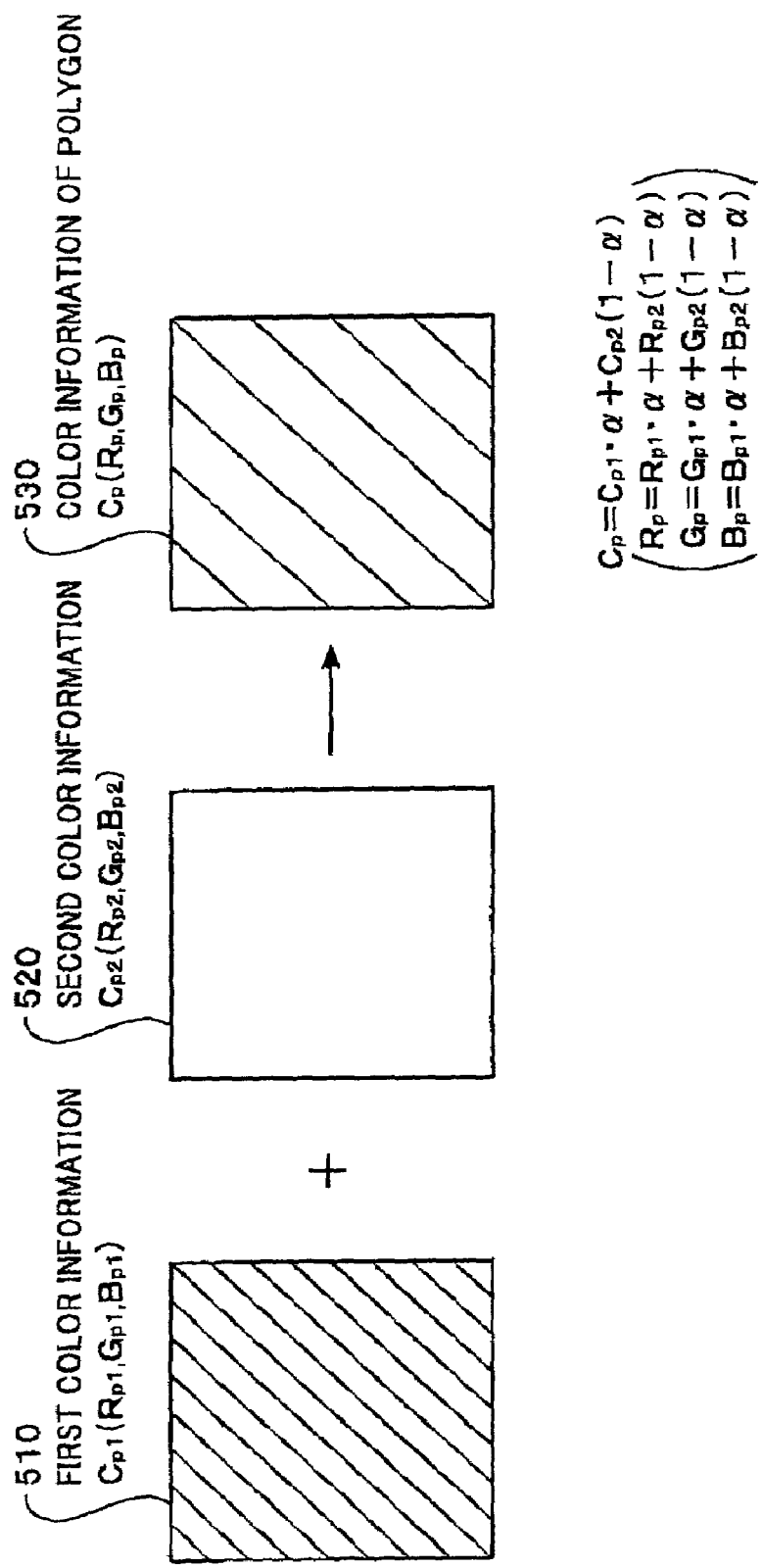
FIG. 9 illustrates a technique of the embodiment that sets a color reflecting the amount of light received by the polygons constructing the simple object.

FIG. 9 illustrates a technique of setting a color reflecting the amount of light received by the polygons constructing the simple object.

In this embodiment, first color information Cp1 (Rp1, Gp1, Bp1) and second color information Cp2 (Rp2, Gp2, Bp2) have been set relative to each of the plate-like (or single or board) polygons constructing the simple object. Preferably, the first color information Cp1 (Rp1, Gp1, Bp1) 510 is a color most weakly influenced by the light while the second color information Cp2 (Rp2, Gp2, Bp2) is another color most strongly influenced by the light.

Using the coefficient α representing the brightness on the polygon face determined based on the angle difference θ, the first color information Cp1 (Rp1, Gp1, Bp1) and the second color information Cp2 (Rp2, Gp2, Bp2) are blended to calculate the color information Cp (Rp, Gp, Bp) according to the following formulas (1)–(4):

$$Cp = Cp1 \cdot \alpha + Cp2 \, (1-\alpha) \quad (1)$$

$$Rp = Rp1 \cdot \alpha + Rp2 \, (1-\alpha) \quad (2)$$

$$Gp = Gp1 \cdot \alpha + Gp2 \, (1-\alpha) \quad (3)$$

$$Bp = Bp1 \cdot \alpha + Bp2 \, (1-\alpha) \quad (4)$$

At θ=0, the brightness is maximum. At θ=π (α=1), the brightness is minimum. Thus, the color information Cp (Rp, Gp, Bp) of the optimum polygon can be calculated according to the angle difference θ within the range between the color most weakly influenced by the light and the color most strongly influenced by the light.

Figure 10A:
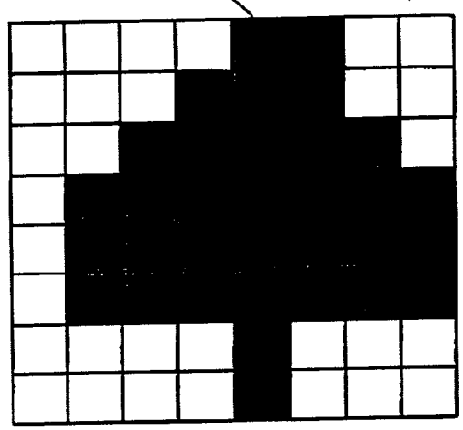
FIGS. 10A and 10B illustrate a coloring when a texture is mapped on a simple object.
Figure 10B:
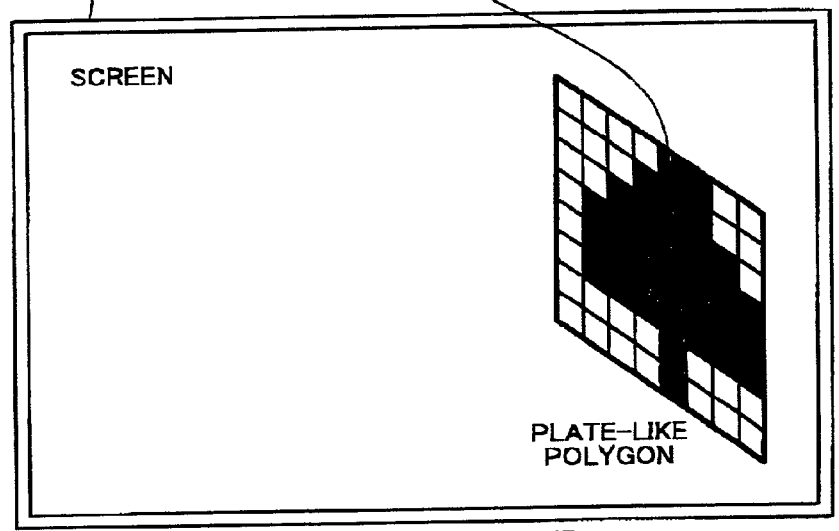

FIGS. 10A and 10B illustrate a coloring on mapping a texture on a simple object.

A texture buffer 610 of FIG. 10A has stored information of a tree texture to be mapped on a plate-like (or single or board) polygon. It is now assumed that the texture color of a pixel Puv is Ct (Rt, Ct, Bt) as shown by 620.

FIG. 10B illustrates a state that the plate-like (or single or board) polygon on which the texture of tree shown in FIG. 10A is mapped is written in a frame buffer 630. The color placed on each pixel in this frame buffer 630 is a color to be displayed on the screen. Reference numeral 640 represents that the color mapped by the texture color of a pixel Puv and displayed on the screen is Cd (Rd, Cd, Bd).

This color Cd (Rd, Gd, Bd) is calculated using the texture color Ct (Rt, Gt, Bt) of a pixel Puv and the color information Cp (Rp, Gp, Bp) of the optimum polygon determined in FIG. 9 according to the following formula (5):

$$Cd \, (Rd, Gd, Bd) = Ct \, (Rt, Gt, Bt) \times Cp \, (Rp, Gp, Bp) \quad (5)$$

In such a manner, the coloring can be changed and displayed according to the amount of light received when the texture is mapped.

Figure 11:
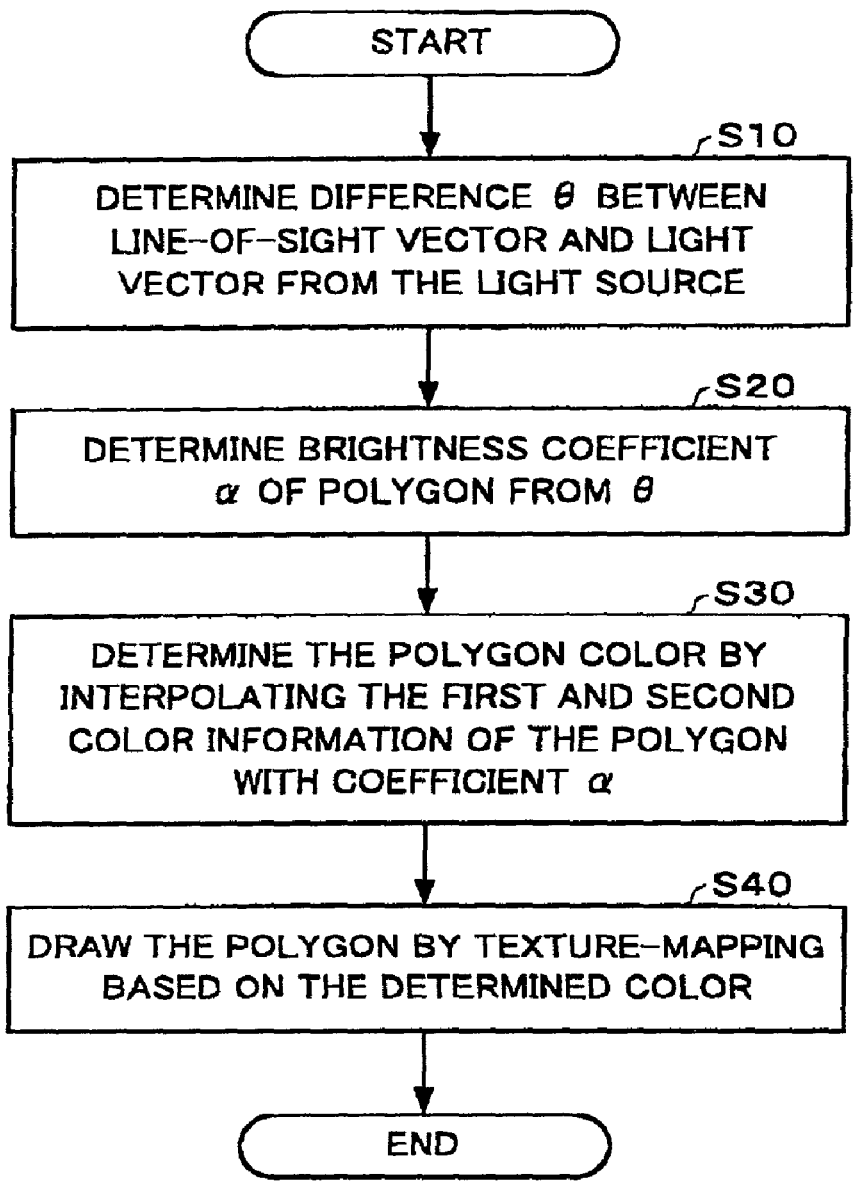
FIG. 11 is a flowchart illustrating a light-source simple processing according to the embodiment.

FIG. 11 is a flowchart illustrating a light-source simple. processing according to this embodiment.

Steps S10–S40 show a process for a given polygon.

As described in connection with FIG. 8, a difference θ between the orientation of the line-of-sight vector and the orientation of the light vector from the light source is first determined (step S10).

A coefficient of brightness α for a polygon is then determined from θ (step S20).

The determined coefficient α is then used to complement the first and second color information for determining a color as described in connection with FIG. 9 (step S30).

The determined color is used to perform the texture mapping and to draw a polygon (step S40). When the texture mapping is to be performed, it is preferred that the drawing is carried out after the coloring value has been determined using the determined color as described in connection with FIGS. 10A and 10B.

3. Hardware Configuration

Figure 12:
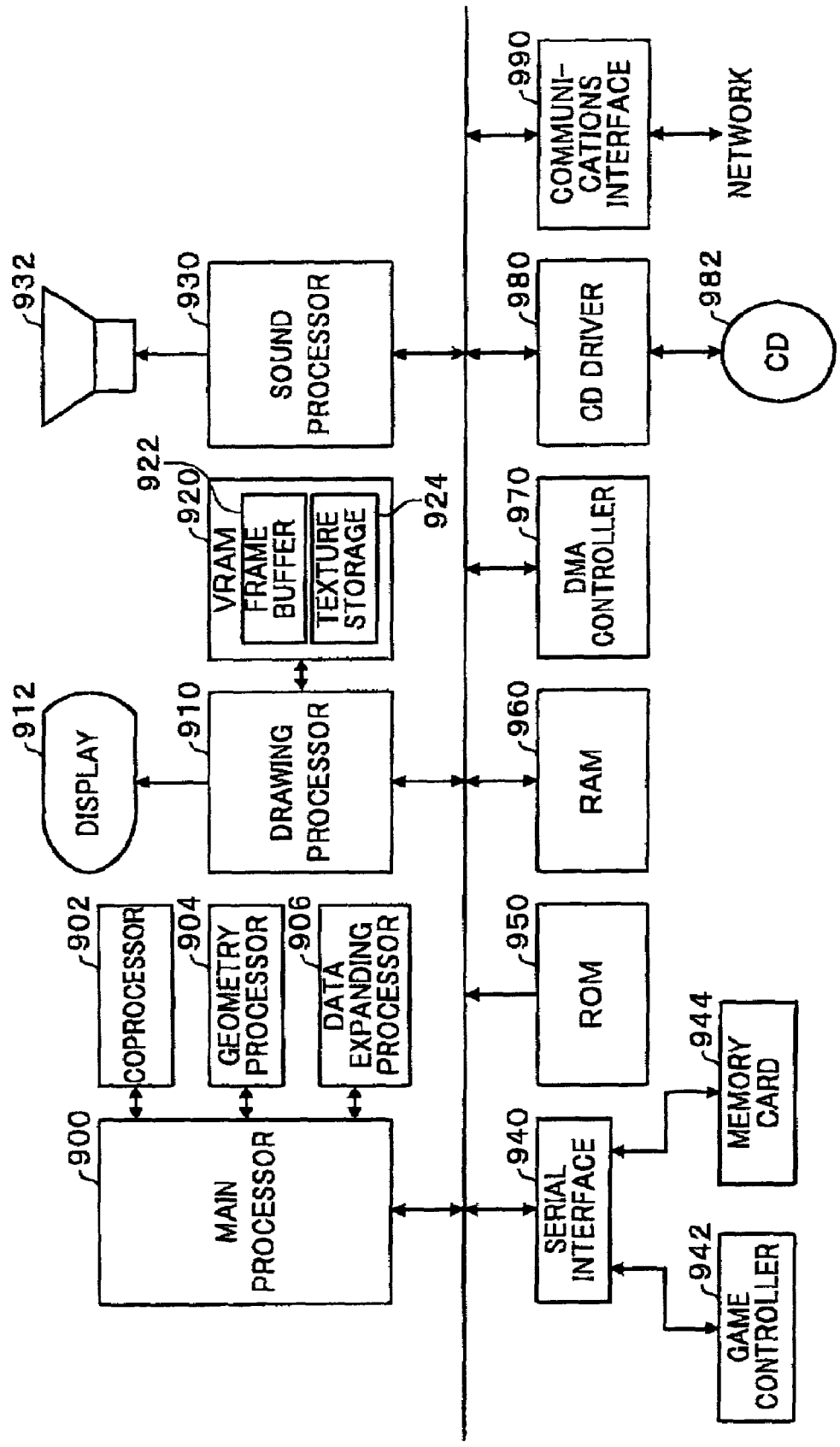
FIG. 12 is a block diagram showing hardware configuration for implementing the embodiment of the present invention.

Hardware configuration for implementing this embodiment is shown in FIG. 12.

A main processor 900 operates to execute various processings such as game processing, image processing, sound processing and other processings according to a program stored in a CD (information storage medium) 982, a program transferred through a communication interface 990 or a program stored in a RON (information storage medium) 950.

A coprocessor 902 is to assist the processing of the main processor 900 and has a product-sum operator and analog divider which can perform high-speed parallel calculation to execute a matrix (or vector) calculation at high speed. If a physical simulation for causing an object to move or act (motion) requires the matrix calculation or the like, the program running on the main processor 900 instructs (or asks) that processing to the coprocessor 902.

A geometry processor 904 is to perform a geometry processing such as coordinate transformation, perspective transformation, light source calculation, curve formation or the like and has a product- sum operator and analog divider which can perform high-speed parallel calculation to execute a matrix (or vector) calculation at high speed. For example, for the coordinate transformation, perspective transformation or light source calculation, the program running on the main processor 900 instructs that processing to the geometry processor 904.

A data expanding processor 906 is to perform a decoding process for expanding image and sound compressed data or a process for accelerating the decoding process in the main processor 900. In the opening, intermission, ending or game scene, thus, an MPEG compressed animation may be displayed. The image and sound data to be decoded may be stored in the storage devices including ROM 950 and CD 982 or may externally be transferred through the communication interface 990.

A drawing processor 910 is to draw or render an object constructed by primitive surfaces such as polygons or curved faces at high speed. On drawing the object, the main processor 900 uses a DMA controller 970 to deliver the object data to the drawing processor 910 and also to transfer a texture to a texture storage section 924, if necessary. Thus, the drawing processor 910 draws the object in a frame buffer 922 at high speed while performing a hidden-surface removal by the use of a Z-buffer or the like, based on the object data and texture. The drawing processor 910 can also perform α-blending (or translucency processing), mip-mapping, fogging, tri-linear filtering, anti-aliasing, shading and so on. As the image for one frame is written into the frame buffer 922, that image is displayed on a display 912.

A sound processor 930 includes any multi-channel ADPCM sound source or the like to generate high-quality game sounds such as BGMS, sound effects and voices. The generated game sounds are outputted from a speaker 932.

The operational data from a game controller 942, saved data from a memory card 944 and personal data may externally be transferred through a serial interface 940.

ROM 950 has stored a system program and so on. For an arcade game system, the ROM 950 functions as an information storage medium in which various programs have been stored. The ROM 950 may be replaced by any suitable hard disk.

RAM 960 is used as a working area for various processors.

The DNA controller 970 controls the DMA transfer between the processors and memories (RAM, VRAM, ROM and the like).

The CD driver 980 drives a CD (information storage medium) 982 in which the programs, image data or sound data have been stored and enables these programs and data to be accessed.

The communication interface 990 is to perform data transfer between the image generation system and any external instrument through a network. In such a case, the network connectable with the communication interface 990 may take any of communication lines (analog phone line or ISDN) or high-speed serial interface bus. The use of the communication line enables the data transfer to be performed through the internet. If the high-speed serial interface bus is used, the data transfer may be carried out between the image generation system and any other image generation system, any other game system or any information processing instrument (such as personal computer, printer, mouse or keyboard).

All the means of the present invention may be executed only through hardware or only through a program which has been stored in an information storage medium or which is distributed through the communication interface. Alternatively, they may be executed both through the hardware and program.

If all the means of the present invention are executed both through the hardware and program, the information storage medium will have stored a program (and data) for executing the means of the present invention through the hardware. More particularly, the aforementioned program instructs the respective processors 902, 904, 906, 910 and 930 which are hardware and also delivers the data to them. if necessary. Each of the processors 902, 904, 906, 910 and 930 will execute the corresponding one of the means of the present invention based on the instruction and delivered data.

Figure 13A:
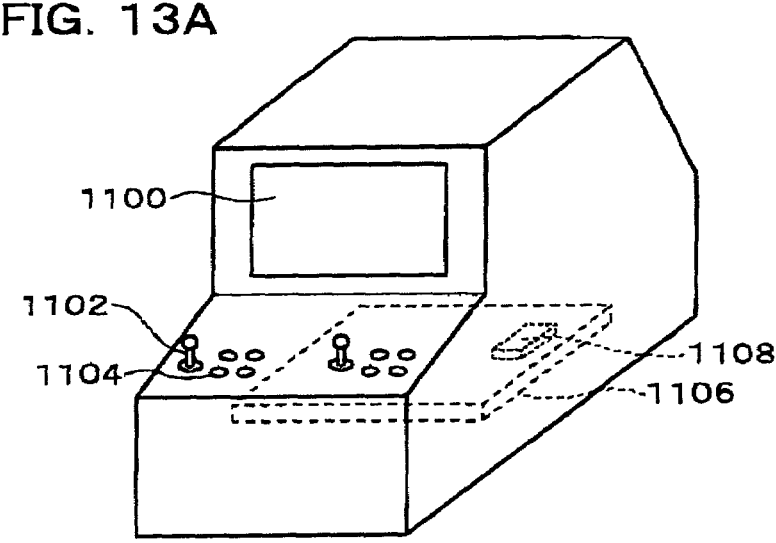
FIGS. 13A, 13B and 13C show various types of systems to which the embodiment can be applied.

FIG. 13A shows an arcade game system to which this embodiment is applied. Players enjoy a game by controlling levers 1102 and buttons 1104 while viewing a game scene displayed on a display 1100. A system board (circuit board) 1106 included in the game system includes various processor and memories which are mounted thereon. A program (and data) for executing all the means of the present invention has been stored in a memory 1108 on the system board 1106, which is an information storage medium, Such information will be referred to "stored information" later.

Figure 13B:
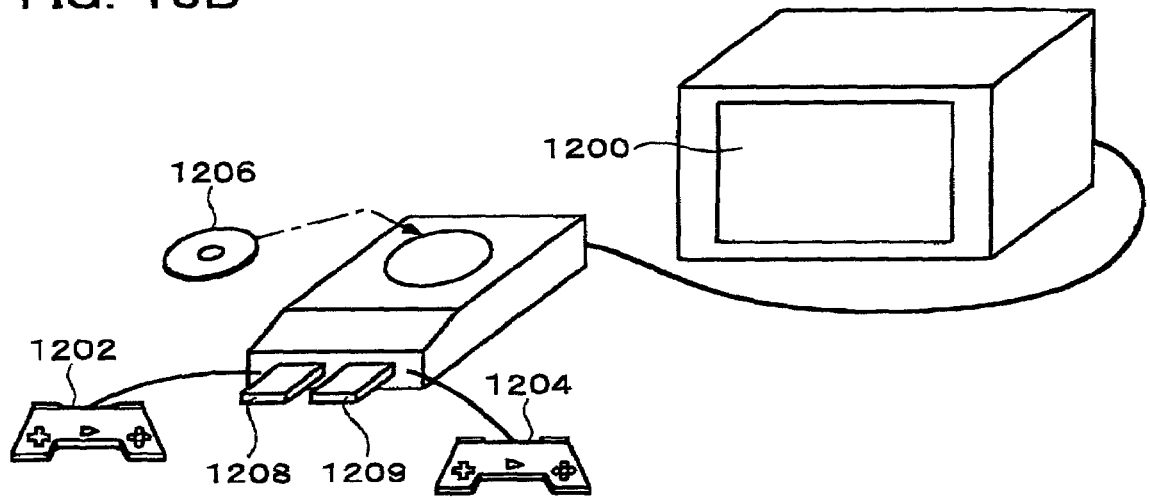

FIG. 13B shows a home game apparatus to which this embodiment is applied A player enjoys a game by manipulating game controllers 1202 and 1204 while viewing a game picture displayed on a display 1200. In such a case, the aforementioned stored information pieces have been stored in DVD 1206 and memory cards 1208, 1209 which are detachable information storage media in the game system body.

Figure 13C:
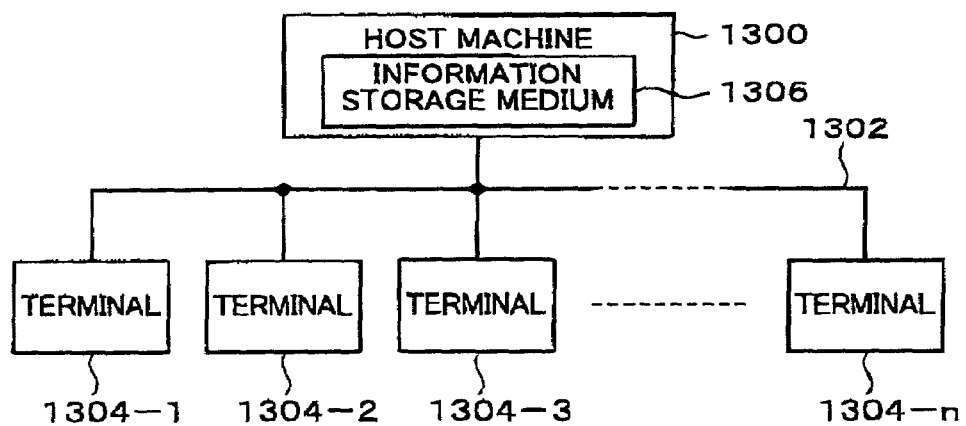

FIG. 13C shows an example wherein this embodiment is applied to a game system which includes a host machine 1300 and terminals 1304-1 to 1304-n connected to the host machine 1300 through a network (which is a small-scale network such as LAN or a global network such as INTERNET) 1302. In such a case, the above stored information pieces have been stored in an information storage medium 1306 such as magnetic disk device, magnetic tape device, semiconductor memory or the like which can be controlled by the host machine 1300, for example. If each of the terminals 1304-1 to 1304-n generates game images and game sounds in a stand-alone manner, the host machine 1300 delivers the game program and other data for generating game images and game sounds to the terminals 1304-1 to 1304-n. On the other hand, if the game images and sounds cannot be generated by the terminals in the stand-alone manner, the host machine 1300 will generate the game images and sounds which are in turn transmitted to the terminals 1304-1 to 1304-n.

In the configuration of FIG. 13C, the means of the present invention maybe decentralized into the host machine (or server) and terminals. The above information pieces for implementing the respective means of the present invention maybe distributed and stored into the information storage media of the host machine (or server) and terminals.

Each of the terminals connected to the network may be either of home or arcade type. When the arcade game systems are connected to the network, it is desirable that each of the arcade game systems includes a portable information storage device (memory card or portable game machine) which can not only transmit the information between the arcade game systems but also transmit the information between the arcade game systems and the home game systems.

The present invention is not limited to the things described in connection with the above forms, but may be carried out in any of various other forms.

For example, the invention relating to one of the dependent claims may not contain part of the structural requirements in any claim to which the one dependent claim belongs. The primary part of the invention defined by one of the independent claim may be belong to any other independent claim.

Although this embodiment has been described as to the plate-like (or single or board) polygon as one simple object, the present invention is not limited to such a form, but may be applied to a simple object which is formed by a combination of polygons, for example.

The simple object is not limited to the polygon object, but may be applied to an object constructed by any other primitive surfaces.

Although this embodiment has been described as to parallel light rays, the present invention is not limited to this, but may be applied to any other light source emitting radially extending rays.

A plurality of light sources may be used in the present invention. In this case, the present invention may be applied to each of the light sources to determine a final brightness or color.

Although this embodiment has been described as to the orientation of the plate like (or single or board) polygon being always parallel to the line-of-sight direction, the present invention is not limited to such a case The brightness and color on the simple object may be determined based on the line-of-sight and light vectors even though the plate-like (or single or board) polygon is not parallel to the line-of-sight direction.

Other than the racing game, the present invention may similarly be applied to any of various other games such as fighting games, shooting games, robot combat games, sports games, competitive games, role-playing games, music playing games, dancing games and so on.

Furthermore, the present invention can be applied to various image generation systems such as arcade game systems, home game systems, large-scaled multi-player attraction systems, simulators, Multimedia terminals, image generation systems, game image generation system boards and so on.

The invention claimed is:

1. An image generation system for generating an image, comprising:
   means which performs a light-source simple processing, the processing being necessary to change at least one of the brightness and color of a surface of a simple object according to the amount of light that is sent from a light source and received by the surface of the simple object; and
   means which generates an image of the simple object based on a result of the light-source simple processing, wherein computation for obtaining information relating to at least one of the brightness and color of a primitive surface constructing the simple object is performed based on an angle difference between a line-of-sight vector of a virtual camera and a light vector from the light source, without using a normal vector for each primitive surface.

2. An image generation system for generating an image, comprising:
   means which performs computation to obtain information relating to at least one of the brightness and color of a primitive surface constructing a simple object, based on an incident angle of a light vector from a light source; and
   means which generates an image of the simple object based on the information relating to at least one of the brightness and color of the primitive surface constructing the simple object,
   wherein computation for obtaining the information relating to at least one of the brightness and color of the primitive surface constructing the simple object is performed based on an angle difference between a line-of-sight vector of a virtual camera and a light vector from the light source, without using a normal vector for each primitive surface.

3. An image generation system for generating an image, comprising:
   means which performs a light-source simple processing, the processing being necessary to change at least one of the brightness and color of a surface of a simple object according to the amount of light that is sent from a light source and received by the surface of the simple object; and
   means which generates an image of the simple object based on a result of the light-source simple processing, wherein computation for obtaining information relating to at least one of the brightness and color of a primitive surface constructing the simple object is performed based on an angle difference between a line-of-sight vector of a virtual camera and a light vector from the light source.

4. The image generation system as defined in claim 3, wherein the angle difference is computed based on two-axis components in both the line-of-sight vector of the virtual camera and the light vector from the light source.

5. An image generation system for generating an image, comprising:
   means which performs computation to obtain information relating to at least one of the brightness and color of a primitive surface constructing a simple object, based on an incident angle of a light vector from a light source; and
   means which generates an image of the simple object based on the information relating to at least one of the brightness and color of the primitive surface constructing the simple object,
   wherein computation for obtaining the information relating to at least one of the brightness and color of the primitive surface constructing the simple object is performed based on an angle difference between a line-of-sight vector of a virtual camera and a light vector from the light source.

6. The image generation system as defined in claim 5, wherein the angle difference is computed based on two-axis components in both the line-of-sight vector of the virtual camera and the light vector from the light source.

7. An image generation system for generating an image, comprising:
   means which performs a light-source simple processing, the processing being necessary to change at least one of the brightness and color of a surface of a simple object according to the amount of light that is sent from a light source and received by the surface of the simple object;
   means which generates an image of the simple object based on a result of the light-source simple processing; and
   means which rotates the simple object such that a normal vector of primitive surfaces constructing the simple object becomes parallel to a line-of-sight vector of a virtual camera.

8. The image generation system as defined in claim 7, wherein the light source is a source of parallel rays.

9. The image generation system as defined in claim 7, wherein the simple object or primitive surfaces constructing the simple object are set to have first and second color information; and
   wherein information relating to the color of the primitive surfaces is computed by interpolation computation based on the first and second color information and information relating to at least one of the brightness and color of one of the primitive surfaces.

10. An image generation system for generating an image, comprising:
    means which performs computation to obtain information relating to at least one of the brightness and color of a primitive surface constructing a simple object, based on an incident angle of a light vector from a light source;
    means which generates an image of the simple object based on the information relating to at least one of the brightness and color of the primitive surface constructing the simple object; and
    means which rotates the simple object such that a normal vector of the primitive surfaces constructing the simple object becomes parallel to a line-of-sight vector of a virtual camera.

11. The image generation system as defined in claim 10, wherein the light source is a source of parallel rays.

12. The image generation system as defined in claim 10, wherein the simple object or the primitive surfaces constructing the simple object are set to have first and second color information; and wherein information relating to the color of the primitive surfaces is computed by interpolation computation based on the first and second color information and information relating to at least one of the brightness and color of one of the primitive surfaces.

13. An image generation system for generating an image, comprising:
  means which performs a light-source simple processing, the processing being necessary to change at least one of the brightness and color of a surface of a simple object according to the amount of light that is sent from a light source and received by the surface of the simple object; and
  means which generates an image of the simple object based on a result of the light-source simple processing,
  wherein information relating to at least one of the brightness and color of a primitive surface constructing one simple object among a plurality of simple objects is used to generate an image of a primitive surface of another simple object among the plurality of simple objects.

14. An image generation system for generating an image, comprising:
  means which performs computation to obtain information relating to at least one of the brightness and color of a primitive surface constructing a simple object, based on an incident angle of a light vector from a light source; and
  means which generates an image of the simple object based on the information relating to at least one of the brightness and color of the primitive surface constructing the simple object,
  wherein the information relating to at least one of the brightness and color of a primitive surface constructing one simple object among a plurality of simple objects is used to generate an image of a primitive surface of another simple object among the plurality of simple objects.

15. An image generation system for generating an image, comprising:
  means which performs a light-source simple processing, the processing being necessary to change at least one of the brightness and color of a surface of a simple object according to the amount of light that is sent from a light source and received by the surface of the simple object; and
  means which generates an image of the simple object based on a result of the light-source simple processing,
  wherein computation for obtaining information relating to at least one of the brightness and color of a primitive surface constructing the simple object is performed based on an angle difference between a line-of-sight vector of a virtual camera and a light vector from the light source, without using a normal vector for each primitive surface,
  wherein the simple object or primitive surfaces constructing the simple object are set to have first and second color information, and
  wherein information relating to the color of the primitive surfaces is computed by interpolation computation based on the first and second color information and information relating to at least one of the brightness and color of one of the primitive surfaces.

16. A computer-usable program embodied on an information storage medium or in a carrier wave, the program implementing on a computer:
  means which performs a light-source simple processing, the processing being necessary to change at least one of the brightness and color of a surface of a simple object according to the amount of light that is sent from a light source and received by the surface of the simple object; and
  means which generates an image of the simple object based on a result of the light-source simple processing,
  wherein computation for obtaining information relating to at least one of the brightness and color of a primitive surface constructing the simple object is performed based on an angle difference between a line-of-sight vector of a virtual camera and a light vector from the light source, without using a normal vector for each primitive surface.

17. A computer-usable program embodied on an information storage medium or in a carrier wave, the program implementing on a computer:
  means which performs computation to obtain information relating to at least one of the brightness and color of a primitive surface constructing a simple object, based on an incident angle of a light vector from a light source; and
  means which generates an image of the simple object based on the information relating to at least one of the brightness and color of the primitive surface constructing the simple object,
  wherein computation for obtaining the information relating to at least one of the brightness and color of the primitive surface constructing the simple object is performed based on an angle difference between a line-of-sight vector of a virtual camera and a light vector from the light source, without using a normal vector for each primitive surface.

18. A computer-usable program embodied on an information storage medium or in a carrier wave, the program implementing on a computer:
  means which performs a light-source simple processing, the processing being necessary to change at least one of the brightness and color of a surface of a simple object according to the amount of light that is sent from a light source and received by the surface of the simple object; and
  means which generates an image of the simple object based on a result of the light-source simple processing,
  wherein computation for obtaining information relating to at least one of the brightness and color of a primitive surface constructing the simple object is performed based on an angle difference between a line-of-sight vector of a virtual camera and a light vector from the light source.

19. The program embodied on an information storage medium or in a carrier wave as defined in claim 18,
  wherein the angle difference is computed based on two-axis components in both the line-of-sight vector of the virtual camera and the light vector from the light source.

20. A computer-usable program embodied on an information storage medium or in a carrier wave, the program implementing on a computer:
  means which performs computation to obtain information relating to at least one of the brightness and color of a primitive surface constructing a simple object, based on an incident angle of a light vector from a light source; and
  means which generates an image of the simple object based on the information relating to at least one of the brightness and color of the primitive surface constructing the simple object,
  wherein computation for obtaining the information relating to at least one of the brightness and color of the primitive surface constructing the simple object is performed based on an angle difference between a line-of-sight vector of a virtual camera and a light vector from the light source.

21. The program embodied on an information storage medium or in a carrier wave as defined in claim 20,
wherein the angle difference is computed based on two-axis components in both the line-of-sight vector of the virtual camera and the light vector from the light source.

22. A computer-usable program embodied on an information storage medium or in a carrier wave, the program implementing on a computer:
means which performs a light-source simple processing, the processing being necessary to change at least one of the brightness and color of a surface of a simple object according to the amount of light that is sent from a light source and received by the surface of the simple object;
means which generates an image of the simple object based on a result of the light-source simple processing; and
means which rotates the simple object such that a normal vector of primitive surfaces constructing the simple object becomes parallel to a line-of-sight vector of a virtual camera.

23. The program embodied on an information storage medium or in a carrier wave as defined in claim 22,
wherein the light source is a source of parallel rays.

24. The program embodied on an information storage medium or in a carrier wave as defined in claim 22,
wherein the simple object or primitive surfaces constructing the simple object are set to have first and second color information; and
wherein information relating to the color of the primitive surfaces is computed by interpolation computation based on the first and second color information and information relating to at least one of the brightness and color of one of the primitive surfaces.

25. A computer-usable program embodied on an information storage medium or in a carrier wave, the program implementing on a computer:
means which performs computation to obtain information relating to at least one of the brightness and color of a primitive surface constructing a simple object, based on an incident angle of a light vector from a light source;
means which generates an image of the simple object based on the information relating to at least one of the brightness and color of the primitive surface constructing the simple object; and
means which rotates the simple object such that a normal vector of the primitive surfaces constructing the simple object becomes parallel to a line-of-sight vector of a virtual camera.

26. The program embodied on an information storage medium or in a carrier wave as defined in claim 25,
wherein the light source is a source of parallel rays.

27. The program embodied on an information storage medium or in a carrier wave as defined in claim 25,
wherein the simple object or the primitive surfaces constructing the simple object are set to have first and second color information; and
wherein information relating to the color of the primitive surfaces is computed by interpolation computation based on the first and second color information and information relating to at least one of the brightness and color of one of the primitive surfaces.

28. A computer-usable program embodied on an information storage medium or in a carrier wave, the program implementing on a computer:
means which performs a light-source simple processing, the processing being necessary to change at least one of the brightness and color of a surface of a simple object according to the amount of light that is sent from a light source and received by the surface of the simple object; and
means which generates an image of the simple object based on a result of the light-source simple processing,
wherein information relating to at least one of the brightness and color of a primitive surface constructing one simple object among a plurality of simple objects is used to generate an image of a primitive surface of another simple objects among the plurality of simple objects.

29. A computer-usable program embodied on an information storage medium or in a carrier wave, the program implementing on a computer:
means which performs computation to obtain information relating to at least one of the brightness and color of a primitive surface constructing a simple object, based on an incident angle of a light vector from a light source; and
means which generates an image of the simple object based on the information relating to at least one of the brightness and color of the primitive surface constructing the simple object,
wherein the information relating to at least one of the brightness and color of a primitive surface constructing one simple object among a plurality of simple objects is used to generate an image of a primitive surface of another simple objects among the plurality of simple objects.

30. A computer-usable program embodied on an information storage medium or in a carrier wave, the program implementing on a computer:
means which performs a light-source simple processing, the processing being necessary to change at least one of the brightness and color of a surface of a simple object according to the amount of light that is sent from a light source and received by the surface of the simple object; and
means which generates an image of the simple object based on a result of the light-source simple processing,
wherein computation for obtaining information relating to at least one of the brightness and color of a primitive surface constructing the simple object is performed based on an angle difference between a line-of-sight vector of a virtual camera and a light vector from the light source, without using a normal vector for each primitive surface,
wherein the simple object or primitive surfaces constructing the simple object are set to have first and second color information, and
wherein information relating to the color of the primitive surfaces is computed by interpolation computation based on the first and second color information and information relating to at least one of the brightness and color of one of the primitive surfaces.

* * * * *